(12) United States Patent
Kim et al.

(10) Patent No.: US 10,302,158 B2
(45) Date of Patent: May 28, 2019

(54) TOUCH POINT LEARNING APPARATUS AND METHOD FOR CLUTCH

(71) Applicants: HYUNDAI MOTOR COMPANY, Seoul (KR); KIA MOTORS CORPORATION, Seoul (KR)

(72) Inventors: Joung Chul Kim, Suwon-si (KR); Ho Young Lee, Bucheon-si (KR); Won Jun An, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 8 days.

(21) Appl. No.: 15/729,077

(22) Filed: Oct. 10, 2017

(65) Prior Publication Data
US 2018/0172092 A1 Jun. 21, 2018

(30) Foreign Application Priority Data

Dec. 15, 2016 (KR) .......................... 10-2016-0171896

(51) Int. Cl.
*F16H 48/06* (2006.01)
*F16D 48/06* (2006.01)
*F16D 13/52* (2006.01)
*F16D 21/06* (2006.01)
*F16D 25/0638* (2006.01)

(52) U.S. Cl.
CPC ............ *F16D 48/062* (2013.01); *F16D 13/52* (2013.01); *F16D 21/06* (2013.01); *F16D 25/0638* (2013.01); *F16D 2021/0661* (2013.01); *F16D 2500/3024* (2013.01); *F16D 2500/50251* (2013.01); *F16D 2500/50266* (2013.01)

(58) Field of Classification Search
None
See application file for complete search history.

(56) References Cited

U.S. PATENT DOCUMENTS

| 6,086,514 A | 7/2000 | Jones et al. |
| 8,172,059 B2 * | 5/2012 | Reuschel ............. F16D 25/088 192/85.55 |

(Continued)

FOREIGN PATENT DOCUMENTS

| JP | 2002-286058 A | 10/2002 |
| JP | 2008128409 A | 6/2008 |

(Continued)

OTHER PUBLICATIONS

Korean Notice of Allowance for Korean Application No. 10-2016-0171896 dated Sep. 27, 2018 (2 pages).

(Continued)

*Primary Examiner* — Dirk Wright
(74) *Attorney, Agent, or Firm* — Brinks Gilson & Lione

(57) ABSTRACT

The present disclosure provides a touch point learning apparatus for a clutch including: a clutch plate connected to an input shaft; a clutch disc connected to an output shaft; a hydraulic pressure chamber to which a working hydraulic pressure is applied, wherein the working hydraulic pressure is capable of engaging or disengaging the clutch plate and the clutch disc; and a controller configured to determine the engaging or disengaging of the clutch plate and the clutch disc based on a change in the working hydraulic pressure.

16 Claims, 5 Drawing Sheets

(56) References Cited

U.S. PATENT DOCUMENTS

| | | | |
|---|---|---|---|
| 8,335,624 B2 | 12/2012 | Suzuki et al. | |
| 8,548,705 B2 * | 10/2013 | Eich | F16D 48/066 180/242 |
| 8,577,571 B2 * | 11/2013 | Einfinger | F16D 48/066 701/67 |
| 8,725,374 B2 * | 5/2014 | Hodrus | F16D 48/06 701/51 |
| 9,127,729 B2 | 9/2015 | Tao et al. | |
| 9,562,576 B2 * | 2/2017 | Hodrus | F16D 48/06 |
| 2010/0032260 A1 * | 2/2010 | Harashima | F16D 25/0638 192/221 |

FOREIGN PATENT DOCUMENTS

| | | |
|---|---|---|
| JP | 2011-0161982 A | 8/2011 |
| JP | 2011-0202749 A | 10/2011 |
| JP | 2013-0079676 A | 5/2013 |
| KR | 20060126382 A | 12/2006 |
| KR | 10-2011-0033455 A | 3/2011 |
| KR | 10-1302329 B | 8/2013 |
| KR | 10-2015-0128950 A | 11/2015 |

OTHER PUBLICATIONS

Korean Office Action for Korean Application No. 10-2016-0171896 filed Dec. 15, 2016 (7 pages).

\* cited by examiner

TOUCH POINT LEARNING APPARATUS AND METHOD FOR CLUTCH

CROSS-REFERENCE TO RELATED APPLICATION

The present application claims priority to and the benefit of Korean Patent Application No. 10-2016-0171896, filed on Dec. 15, 2016, which is incorporated herein by reference in its entirety.

FIELD

The present disclosure relates to a touch point learning apparatus and method for a clutch.

BACKGROUND

The statements in this section merely provide background information related to the present disclosure and may not constitute prior art.

Learning a clutch touch point is a key technology in controlling a wet clutch. A touch point is a point at which a clutch is engaged to start the transmission of torque from an input shaft to an output shaft. By learning the touch point, it allows the clutch engagement to be performed rapidly in a section far away from the touch point as well as to be performed gently in a section adjacent to the touch point to inhibit shifting shock.

However, an apparatus and a method for easily learning the touch point of the wet clutch have not been proposed in the related art, and learning the touch point has become a difficult task.

SUMMARY

An aspect of the present disclosure provides a touch point learning apparatus and method for a clutch, improved to learn a touch point of a wet clutch easily.

According to an aspect of the present disclosure, a touch point learning apparatus for a clutch includes: a clutch plate connected to an input shaft; a clutch disc connected to an output shaft; a hydraulic pressure chamber to which a working hydraulic pressure is applied, wherein the working hydraulic pressure is capable of engaging or disengaging the clutch plate and the clutch disc; and a controller configured to determine the engaging or disengaging of the clutch plate and the clutch disc based on a change in the working hydraulic pressure.

The controller may determine that the clutch plate and the clutch disc are engaged when a rate of increase in working hydraulic pressure per a certain period of time is higher than or equal to a predetermined rate of increase.

The controller may determine that the clutch plate and the clutch disc are engaged when the working hydraulic pressure is higher than or equal to a predetermined engagement pressure.

The touch point learning apparatus may further include: a piston configured to engage or disengage the clutch plate and the clutch disc by pressing or releasing the clutch plate, and the hydraulic pressure chamber configured to move the piston in a direction close to the clutch plate based on the working hydraulic pressure.

The touch point learning apparatus may further include: a return spring configured to transfer the piston in a direction away from the clutch plate by elastically pressing the piston.

The controller may be configured to analyze the change and identify a stop section in which the working hydraulic pressure is lower than or equal to a preload applied to the piston by the return spring, and an engagement section in which the working hydraulic pressure corresponds to an engagement pressure higher than the preload and the rate of increase in the working hydraulic pressure per the certain period of time is higher than or equal to the predetermined rate of increase.

The controller may determine that the clutch plate and the clutch disc are engaged when the change reaches the engagement section.

The controller may be configured to analyze the change and to further identify a transfer section in which the working hydraulic pressure corresponds to a transfer pressure between the preload and the engagement pressure and the rate of increase in working hydraulic pressure per the certain period of time is lower than the predetermined rate of increase.

The controller may determine that transfer of the piston toward the clutch plate is started when the change reaches the transfer section.

The touch point learning apparatus may further include a hydraulic pressure sensor configured to measure the working hydraulic pressure.

According to another aspect of the present disclosure, a touch point learning method for a clutch, where a piston transferred by a working hydraulic pressure is utilized to engage a clutch plate with a clutch disc by pressing the clutch plate, includes the steps of: (a) applying the working hydraulic pressure in a predetermined method; (b) measuring a change in the working hydraulic pressure; and (c) determining whether or not the clutch plate and the clutch disc are engaged based on the change.

Step (c) may include determining that the clutch plate and the clutch disc are engaged when a rate of increase in working hydraulic pressure per a certain period of time is higher than a predetermined rate of increase.

Step (c) may include analyzing the change and identifying a stop section in which the working hydraulic pressure is lower than or equal to a preload applied to the piston by a return spring, and an engagement section in which the working hydraulic pressure corresponds to an engagement pressure higher than the preload and the rate of increase in the working hydraulic pressure per the certain period of time is higher than or equal to the predetermined rate of increase.

Step (c) may include determining that the clutch plate and the clutch disc are engaged when the change reaches the engagement section.

Step (c) may include identifying a transfer section in which the working hydraulic pressure corresponds to a transfer pressure between the preload and the engagement pressure and the rate of increase in working hydraulic pressure per the certain period of time is lower than the predetermined rate of increase.

Step (c) may include determining that transfer of the piston toward the clutch plate is started when the change reaches the transfer section.

The touch point learning method may further include the steps of: (d) comparing an actual time measured from a point that the working hydraulic pressure is applied to a point that the change reaches the engagement section with a predetermined time; and (e) switching the predetermined time to the actual time and changing application of working hydraulic pressure based on the actual time when the actual time differs from the predetermined time.

Step (a) may be performed based on the application of the working hydraulic pressure changed in step (e).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
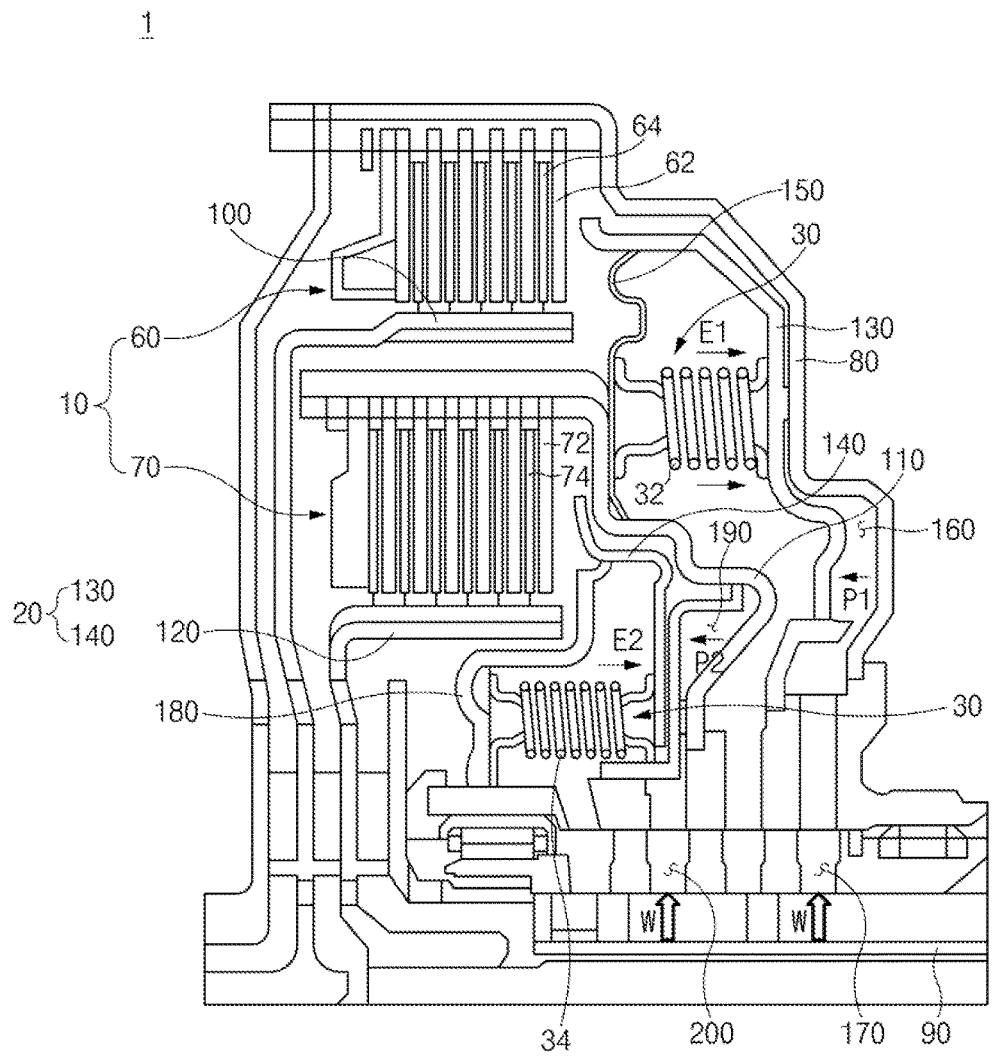
FIG. 1 illustrates the configuration of a touch point learning apparatus for a clutch.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A touch point learning apparatus for a clutch (hereinafter referred to as the "touch point learning apparatus 1"), in some forms of the present disclosure, may be provided to learn a touch point of a wet clutch. Hereinafter, the touch point learning apparatus 1 will be described with an example of how the touch point of a wet clutch dual clutch transmission (DCT) is learned.

Figure 2:
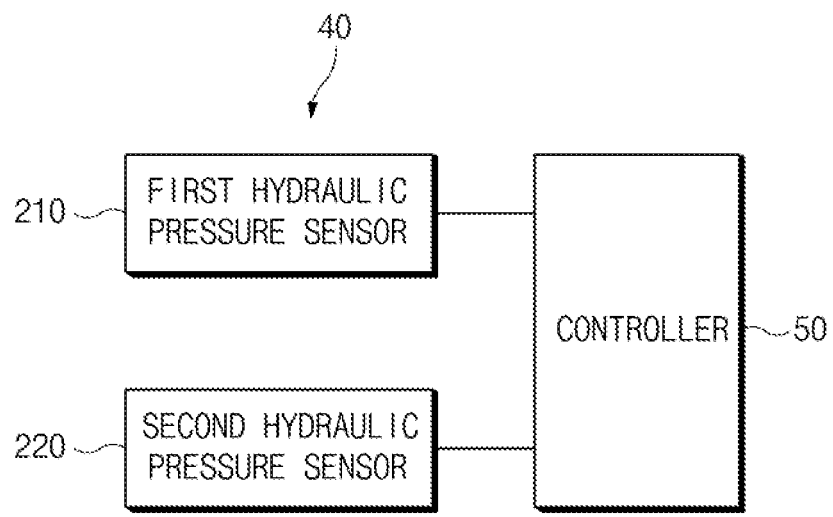
FIG. 2 illustrates a block diagram of a control system of the touch point learning apparatus illustrated in FIG. 1.

FIG. 1 illustrates the configuration of a touch point learning apparatus for a clutch, in some forms of the present disclosure, and FIG. 2 illustrates a block diagram of a control system of the touch point learning apparatus illustrated in FIG. 1.

Figure 3:
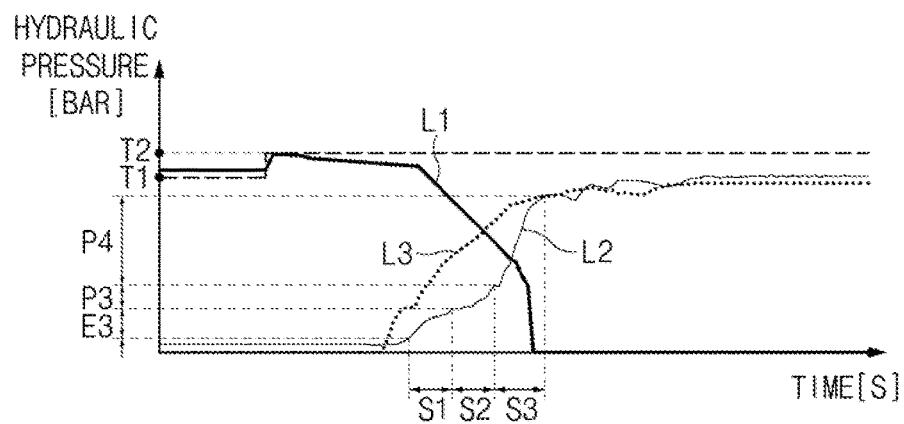
FIG. 3 illustrates a graph showing changes in working hydraulic pressure applied to a hydraulic pressure chamber illustrated in FIG. 1.
Figure 4:
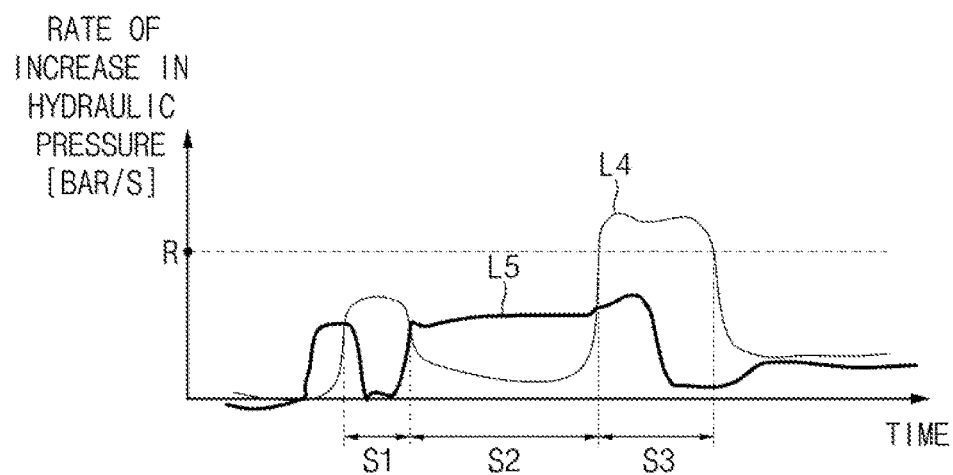
FIG. 4 illustrates a graph showing the rate of increase in working hydraulic pressure applied to the hydraulic pressure chamber illustrated in FIG. 1, per unit time.

FIG. 3 illustrates a graph showing changes in working hydraulic pressure applied to a hydraulic pressure chamber illustrated in FIG. 1, and FIG. 4 illustrates a graph showing the rate of increase in working hydraulic pressure applied to the hydraulic pressure chamber illustrated in FIG. 1, per unit time.

Referring to FIG. 1, the touch point learning apparatus 1 includes a clutch 10, a piston 20, a return spring 30, a hydraulic pressure sensor 40, and a controller 50.

The clutch 10 includes, as illustrated in FIG. 1, a first clutch 60 and a second clutch 70.

The first clutch 60 includes first clutch plates 62 and first clutch discs 64.

The first clutch plates 62 may be arranged at predetermined intervals, and may be individually coupled to a first clutch retainer 80 to be connected to an input shaft 90. The first clutch discs 64 may be arranged at predetermined intervals, and may be individually coupled to a first clutch hub 100 to be connected to a first output shaft (not shown). The first clutch plates 62 and the first clutch discs 64 may be arranged to alternate with each other at predetermined intervals, as illustrated in FIG. 1.

The second clutch 70 includes second clutch plates 72 and second clutch discs 74.

The second clutch plates 72 may be arranged at predetermined intervals, and may be individually coupled to a second clutch retainer 110 to be connected to the input shaft 90. The second clutch discs 74 may be arranged at predetermined intervals, and may be individually coupled to a second clutch hub 120 to be connected to a second output shaft (not shown). The second clutch plates 72 and the second clutch discs 74 may be arranged to alternate with each other at predetermined intervals, as illustrated in FIG. 1.

The piston 20 includes a first piston 130 and a second piston 140.

As illustrated in FIG. 1, the first piston 130 may be disposed to be movable between the first clutch retainer 80 and the first clutch plates 62. The first piston 130 may be supported by a first piston retainer 150. A working fluid W may be introduced through a first fluid supply hole 170 to form a first hydraulic pressure chamber 160, to which a first working hydraulic pressure P1 is applied, between the first piston 130 and the first clutch retainer 80. The first working hydraulic pressure P1 may press the first piston 130 in a direction close to the first clutch plates 62.

As illustrated in FIG. 1, the second piston 140 may be disposed to be movable between the second clutch retainer 110 and the second clutch plates 72. The second piston 140 may be supported by a second piston retainer 180. The working fluid W may be introduced through a second fluid supply hole 200 to form a second hydraulic pressure chamber 190, to which a second working hydraulic pressure P2 is applied, between the second piston 140 and the second clutch retainer 180. The second working hydraulic pressure P2 may press the second piston 140 in a direction close to the second clutch plates 72.

The return spring 30 includes a first return spring 32 and a second return spring 34.

The first return spring 32 may be interposed between the first piston 130 and the first piston retainer 150. The first return spring 32 may elastically press the first piston 130 in a direction away from the first clutch plates 62. Elastic pressure (hereinafter referred to as the "first elastic pressure E1") of the first return spring 32 may be increased in proportion to an amount of compression of the first return spring 32.

The first working hydraulic pressure P1 and the first elastic pressure E1 acting in opposite directions may be applied to the first piston 130. Therefore, the first piston 130 may be transferred back and forth by the first working hydraulic pressure P1 and the first elastic pressure E1 to move forward in a direction close to the first clutch plates 62 or move backward in a direction away from the first clutch plates 62. Through the reciprocating movement of the first piston 130, the first return spring 32 may be extended or compressed, and the volume of the first hydraulic pressure chamber 160 may be increased or decreased.

When only the first elastic pressure E1 is applied to the first piston 130, the first piston 130 may be maximally moved backward to be stopped, and thus the first return spring 32 may be maximally extended and the volume of the first hydraulic pressure chamber 160 may be decreased.

Hereinafter, the first elastic pressure E1 in a state in which the first return spring 32 is maximally extended is referred to as a first preload E3.

When the first working hydraulic pressure P1 is applied to the first piston 130 in a state in which the first piston 130 is maximally moved backward to be stopped, the first piston 130 may be maintained in the stopped state. The first piston 130 may then be moved forward when the first working hydraulic pressure P1 is higher than the first preload E3, thereby being brought into contact with a last first clutch plate 62 of the first clutch plates 62. The first piston 130 may press the first clutch plates 62 to allow the first clutch plates 62 and the first clutch discs 64 to be engaged. Then, torque of the first clutch retainer 80 may be transmitted to the first clutch hub 100 through the first clutch 60. In addition, when the first piston 130 is moved forward, the first return spring 32 may be compressed and the volume of the first hydraulic pressure chamber 160 may be increased.

When the first working hydraulic pressure P1 is released in a state in which the first piston 130 presses the first clutch plates 62, the first piston 130 may keep pressing the first clutch plates 62. The first piston 130 may then be moved backward when the first working hydraulic pressure P1 is lower than the first elastic pressure E1, thereby being spaced apart from the first clutch plates 62. The first piston 130 may release the pressure on the first clutch plates 62 to allow the first clutch plates 62 and the first clutch discs 64 to be disengaged. Then, the torque of the first clutch retainer 80 may be blocked by the first clutch 60 and may not be transmitted to the first clutch hub 100. In addition, when the first piston 130 is moved backward, the first return spring 32 may be extended and the volume of the first hydraulic pressure chamber 160 may be decreased.

The second return spring 34 may be interposed between the second piston 140 and the second piston retainer 180. The second return spring 34 may elastically press the second piston 140 in a direction away from the second clutch plates 72. Elastic pressure (hereinafter referred to as the "second elastic pressure E2") of the second return spring 34 may be increased in proportion to an amount of compression of the second return spring 34. The forward or backward movement of the second piston 140 and the engagement or disengagement of the second clutch plates 72 and the second clutch discs 74 may be the same as those described with respect to the first clutch 60, and thus a detailed description thereof will be omitted.

Hereinafter, the engagement of the clutch plates 62 and 72 and the clutch discs 64 and 74 is referred to as the engagement of the clutch 10, and the disengagement of the clutch plates 62 and 72 and the clutch discs 64 and 74 is referred to as the disengagement of the clutch 10. A point at which the clutch 10 is engaged to start the transmission of torque from the clutch retainers 80 and 110 to the clutch hubs 100 and 120 is referred to as a touch point of the clutch 10.

The hydraulic pressure sensor 40 includes a first hydraulic pressure sensor 210 and a second hydraulic pressure sensor 220.

The first hydraulic pressure sensor 210 may be provided to measure the first working hydraulic pressure P1. The first hydraulic pressure sensor 210 may be provided on a first fluid supply line connected to the first fluid supply hole 170, but is not limited thereto. As illustrated in FIG. 2, the first hydraulic pressure sensor 210 may sense the first working hydraulic pressure P1 and transmit the sensed value to the controller 50, and the controller 50 may calculate the first working hydraulic pressure P1 on the basis of data sensed by the first hydraulic pressure sensor 210.

The second hydraulic pressure sensor 220 may be provided to measure the second working hydraulic pressure P2. The second hydraulic pressure sensor 220 may be provided on a second fluid supply line connected to the second fluid supply hole 200, but is not limited thereto. The second hydraulic pressure sensor 220 may sense the second working hydraulic pressure P2 and transmit the sensed value to the controller 50, and the controller 50 may calculate the second working hydraulic pressure P2 on the basis of data sensed by the second hydraulic pressure sensor 220.

FIG. 3 illustrates a graph showing changes in working hydraulic pressure applied to the hydraulic pressure chamber illustrated in FIG. 1, and FIG. 4 illustrates a graph showing the rate of increase in working hydraulic pressure applied to the hydraulic pressure chamber illustrated in FIG. 1, per unit time.

In FIG. 3, first to third hydraulic pressure curves L1 to L3 are illustrated. The first hydraulic pressure curve L1 represents an actual change in working hydraulic pressure when a clutch for even gears is disengaged. T1 represents the maximum working hydraulic pressure in even gears. The second hydraulic pressure curve L2 represents an actual change in working hydraulic pressure when a clutch for odd gears is engaged. T2 represents the maximum working hydraulic pressure in odd gears. The third hydraulic pressure curve L3 represents a predicted change in working hydraulic pressure when the clutch for odd gears is engaged. The actual change in working hydraulic pressure refers to a change in working hydraulic pressure measured using the hydraulic pressure sensor in real time. The predicted change in working hydraulic pressure refers to a change in working hydraulic pressure predicted from previously measured data.

In FIG. 4, a first increase rate curve L4 and a second increase rate curve L5 are illustrated. The first increase rate curve L4 represents the actual rate of increase in working hydraulic pressure per unit time when a clutch for odd gears is engaged. The second increase rate curve L5 represents the predicted rate of increase in working hydraulic pressure per unit time when the clutch for odd gears is engaged. The actual rate of increase in working hydraulic pressure per unit time refers to the rate of increase in working hydraulic pressure per unit time, which is calculated in real time using the above-described actual change in working hydraulic pressure. The predicted rate of increase in working hydraulic pressure per unit time refers to the rate of increase in working hydraulic pressure per unit time, which is predicted using the above-described predicted change in working hydraulic pressure.

The controller 50 may control the overall operations of the touch point learning apparatus 1, and may be able to learn a touch point based on changes in working hydraulic pressure.

As described above, the first clutch 60 and the second clutch 70 may constitute a wet clutch DCT. One of the first clutch 60 and the second clutch 70 may be selectively engaged in odd gears, and the other one of the first clutch 60 and the second clutch 70 may be selectively engaged in even gears. For example, the first clutch 60 may be selectively engaged in the odd gears, and the second clutch 70 may be selectively engaged in the even gears.

When the DCT shifts the gears from a current gear to a target gear using the clutch 10, a working hydraulic pressure for the engagement of the clutch 10 corresponding to the current gear may be released, and a working hydraulic pressure for the engagement of the clutch 10 corresponding to the target gear may be applied. For example, as illustrated in FIG. 3, when the even gear is shifted to the odd gear, the second working hydraulic pressure P2 may be released, and the first working hydraulic pressure P1 may be applied. Then, as illustrated in FIG. 3, the second working hydraulic pressure P2 may be decreased according to the first hydraulic pressure curve L1 to allow the second clutch 70 to be disengaged, and the first working hydraulic pressure P1 may be increased according to the second hydraulic pressure curve L2 to allow the first clutch 60 to be engaged.

When the application of the working hydraulic pressure is started in a state in which the preload of the return spring 30 is only exerted on the piston 20, the volumes of the hydraulic pressure chambers 160 and 190 may be maintained until the piston 20 starts to move forward as the working hydraulic pressure is higher than the preload. Then, the working fluid W may be compressed in a state in which the volumes of the hydraulic pressure chambers 160 and 190 are maintained.

In addition, when the piston 20 is moved forward as the working hydraulic pressure is higher than the preload, the volumes of the hydraulic pressure chambers 160 and 190 may be increased in proportion to the forward movement distance of the piston 20. Then, the working fluid W may be compressed in a state in which the volumes of the hydraulic pressure chambers 160 and 190 are increased.

In addition, when the piston 20 is brought into contact with the last clutch plates 62 and 72 among the clutch plates 62 and 72 to be stopped, the volumes of the hydraulic pressure chambers 160 and 190 may be maintained until the piston 20 starts to move backward as the working hydraulic pressure is lower than the elastic pressure. Then, the working fluid W may be compressed in a state in which the volumes of the hydraulic pressure chambers 160 and 190 are maintained.

As described above, the working hydraulic pressure may be varied in relation to the elastic pressure (preload) and the volumes of the hydraulic pressure chambers 160 and 190. The controller 50 may analyze changes in working hydraulic pressure to classify a stop section S1, a transfer section S2, and an engagement section S3, and be able to learn a touch point on the basis of such section data. For example, as illustrated in FIG. 3, the controller 50 may analyze a change in the first working hydraulic pressure P1, i.e., the second hydraulic pressure curve L2 to classify the stop section S1, the transfer section S2, and the engagement section S3, and be able to learn a touch point of the first clutch 60 on the basis of section data with respect to the first working hydraulic pressure P1.

The stop section S1 refers to a section where the piston 20 is stopped in a state of being maximally moved backward as the working hydraulic pressure is lower than or equal to the preload. For example, as illustrated in FIG. 3, the stop section S1 is a section where the first piston 130 is stopped in a state of being maximally moved backward as the first working hydraulic pressure P1 ranges from 2 bar to 3.5 bar, which is lower than or equal to the first preload E3, 3.5 bar, of the first return spring 32.

The transfer section S2 refers to a section where the piston 20 is moved forward as the working hydraulic pressure corresponds to a transfer pressure higher than the preload. For example, as illustrated in FIG. 3, the transfer section S2 is a section where the first piston 130 is moved forward as the first working hydraulic pressure P1 corresponds to the transfer pressure P3, which is higher than the first preload E3 of 3.5 bar and is lower than a pressure of 6 bar at a moment of contact between the first piston 130 and the first clutch plate 62.

The engagement section S3 refers to a section where the piston 20 is stopped in a state of being pressed and brought into contact with the clutch plates 62 and 72 as the working hydraulic pressure corresponds to an engagement pressure higher than the transfer pressure. For example, as illustrated in FIG. 3, the engagement section S3 is a section where the first piston 130 is stopped in a state of being pressed and brought into contact with the clutch plates 62 as the first working hydraulic pressure P1 corresponds to the engagement pressure P4, which is higher than or equal to a pressure of 6 bar at the moment of contact between the first piston 130 and the first clutch plate 62.

The stop section S1 and the engagement section S3 in which the working fluid W is compressed in a state in which the volumes of the hydraulic pressure chambers 160 and 190 are maintained may have a higher rate of increase in working hydraulic pressure per unit time, compared to the transfer section S2 in which the working fluid W is compressed in a state in which the volumes of the hydraulic pressure chambers 160 and 190 are increased. For example, as illustrated in FIG. 4, the rate of increase in the first working hydraulic pressure P1 per unit time according to the first increase rate curve L4 may be the highest in the engagement section S3, and be the lowest in the transfer section S2.

When the change in working hydraulic pressure reaches the engagement section S3, the controller 50 may learn that the touch point is reached such that the clutch 10 is engaged. In other words, when the working hydraulic pressure reaches the engagement pressure and the rate of increase in working hydraulic pressure per unit time corresponds to a predetermined reference increase rate, the controller 50 may learn that the touch point is reached. For example, as illustrated in FIGS. 3 and 4, when the first working hydraulic pressure P1 reaches the engagement pressure P4 and the rate of increase in the first working hydraulic pressure P1 per unit time reaches a reference increase rate R, the controller 50 may learn that the touch point of the first clutch 60 is reached such that the first clutch 60 is engaged. However, the learning of the controller 50 is not limited thereto. The controller 50 may learn that the touch point is reached such that the first clutch 60 is engaged when the first working hydraulic pressure P1 reaches the engagement pressure P4 or the rate of increase in the first working hydraulic pressure P1 per unit time reaches the reference increase rate R. In other words, even when any one of the pressure and increase rate conditions of the working hydraulic pressure is only satisfied, the controller 50 may learn that the touch point of the clutch 10 is reached.

When the change in working hydraulic pressure reaches the transfer section S2, the controller 50 may learn that the forward movement of the piston 20 is started. In other words, when the working hydraulic pressure reaches the transfer pressure and the rate of increase in working hydraulic pressure per unit time is lower than the reference increase rate, the controller 50 may learn that the forward movement of the piston 20 is started. However, the learning of the controller 50 is not limited thereto. The controller 50 may also learn that the forward movement of the piston 20 is started when the working hydraulic pressure reaches the transfer pressure.

Meanwhile, when the clutch 10 is used for a long period of time, the clutch plates 62 and 72 and the clutch discs 64 and 74 may be worn out. Thus, a transfer distance of the piston 20 required for the engagement of the clutch plates 62 and 72 and the clutch discs 64 and 74 and a time taken to reach the touch point may be gradually increased. Therefore, as illustrated in FIGS. 3 and 4, the second hydraulic pressure curve L2 and the first increase rate curve L4 representing the data measured in real time differ from the third hydraulic pressure curve L3 and the second increase rate curve L5 representing the previously measured data.

By reflecting the differences in data, the controller 50 may newly learn a touch point at predetermined cycles, compare the newly learned touch point with a previously stored reference touch point, and change the reference touch point to the newly learned touch point when the newly learned touch point differs from the reference touch point. Here, the reference touch point refers to a touch point that has been previously learned on the basis of the previously measured change in working hydraulic pressure. The learning cycle of the touch point is not particularly limited, and it may be determined according to the wear rate of the clutch plates 62 and 72 and the clutch discs 64 and 74 and other environmental conditions.

The controller 50 may change a method of applying the working hydraulic pressure to the piston on the basis of the changed reference touch point. For example, the controller 50 may transfer the piston 20 at a relatively rapid rate before a distance between the piston 20 and the clutch plates 62 and 72 is within a predetermined distance, and may transfer the piston 20 at a relatively slow rate when the distance between the piston 20 and the clutch plates 62 and 72 is within the predetermined distance. Thus, the controller 50 may achieve rapid response and smooth change during gear shifts.

Figure 5:
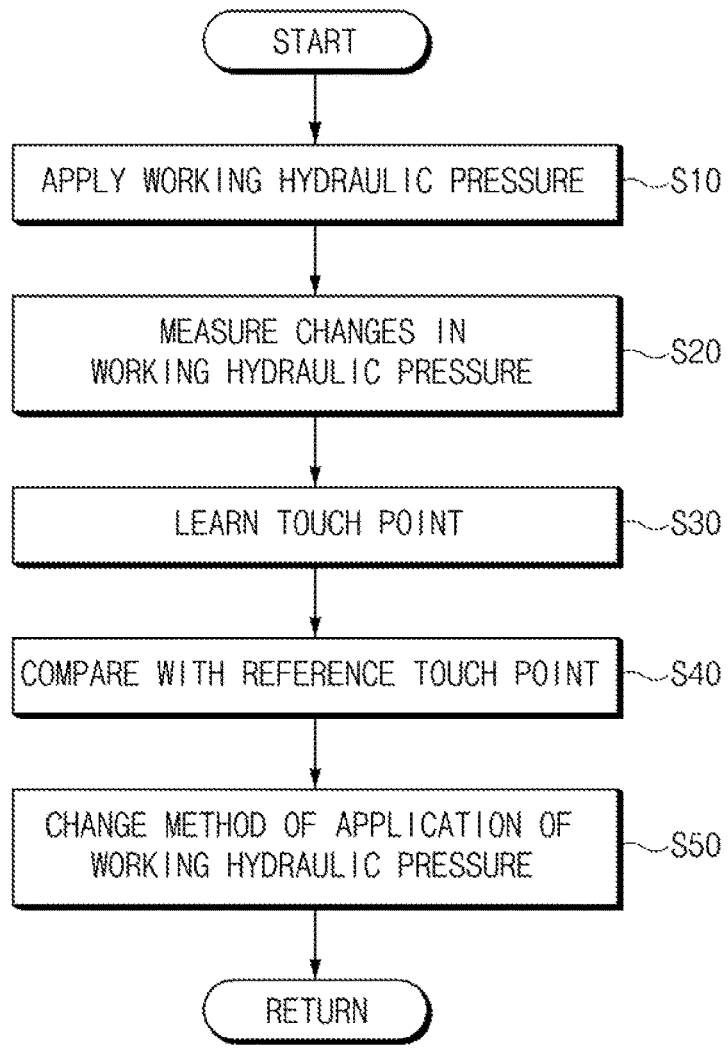
FIG. 5 illustrates a flowchart of a touch point learning method for a clutch.

FIG. 5 illustrates a flowchart of a touch point learning method for a clutch, in another form of the present disclosure.

Referring to FIG. 5, the touch point learning method for a clutch, in another form of the present disclosure, includes: applying a working hydraulic pressure in a predetermined method in step S10; measuring a change in working hydraulic pressure in step S20; and determining whether or not the clutch plates 62 and 72 and the clutch discs 64 and 74 are engaged on the basis of the change in working hydraulic pressure in step S30.

First of all, the working hydraulic pressure may be applied to the hydraulic pressure chambers 160 and 190 in step S10.

Next, the change in working hydraulic pressure may be measured using the hydraulic pressure sensor 40 in step S20.

Thereafter, in step S30, the change in working hydraulic pressure may be analyzed to classify the stop section S1 in which the working hydraulic pressure is lower than or equal to a preload, the transfer section S2 in which the working hydraulic pressure corresponds to a transfer pressure between the preload and an engagement pressure and the rate of increase in working hydraulic pressure per unit time is lower than a reference increase rate, and the engagement section S3 in which the working hydraulic pressure corresponds to the engagement pressure higher than the transfer pressure and the rate of increase in working hydraulic pressure per unit time is higher than or equal to the predetermined reference increase rate.

In addition, step S30 may be performed by learning that the clutch plates 62 and 72 are engaged with the clutch discs 64 and 74 when the change in working hydraulic pressure reaches the engagement section S3. In other words, step S30 may be performed by learning that a touch point is reached when the change in working hydraulic pressure reaches the engagement section S3. However, this step is not limited thereto. Step S30 may also be performed by learning that the touch point is reached when the working hydraulic pressure reaches the engagement pressure or the rate of increase in working hydraulic pressure per unit time reaches the reference increase rate.

Furthermore, step S30 may be performed by learning that the forward movement of the piston 20 is started when the change in working hydraulic pressure reaches the transfer section S2.

Meanwhile, the touch point learning method in some forms of the present disclosure further includes: comparing an actual time taken from a point in time at which the application of the working hydraulic pressure is started to a point in time at which the change in working hydraulic pressure reaches the engagement section S3 with a predetermined reference time in step S40; and changing a method of application of working hydraulic pressure on the basis of the actual time in step S50.

The actual time taken to reach the touch point may be compared with the reference time taken to reach a previously stored reference touch point in step S40.

Then, when the actual time differs from the reference time, the reference time may be changed to the actual time and the method of application of working hydraulic pressure may be changed on the basis of the actual time in step S50. In addition, step S10 may be performed on the basis of the method of application of working hydraulic pressure changed in step S50.

The touch point learning apparatus and method for a clutch in some forms of the present disclosure have the following effects:

First, it may be easy to learn the touch point of the clutch on the basis of changes in working hydraulic pressure.

Second, rapid response and smooth change during gear shifts may be achieved by changing the method of application of working hydraulic pressure on the basis of the touch point of the clutch.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A touch point learning apparatus for a clutch, the touch point learning apparatus comprising:
   a clutch plate connected to an input shaft;
   a clutch disc connected to an output shaft;
   a hydraulic pressure chamber to which a working hydraulic pressure is applied, wherein the working hydraulic pressure is capable of engaging or disengaging the clutch plate and the clutch disc; and
   a controller configured to:
      determine the engaging or disengaging of the clutch plate and the clutch disc based on a change in the working hydraulic pressure; and
      determine that the clutch plate and the clutch disc are engaged when a rate of increase in the working hydraulic pressure per a certain period of time is higher than or equal to a predetermined rate of increase.

2. The touch point learning apparatus according to claim 1, wherein:
   when the working hydraulic pressure is higher than or equal to a predetermined engagement pressure, the controller is configured to determine that the clutch plate and the clutch disc are engaged.

3. The touch point learning apparatus according to claim 1, further comprising:
   a piston configured to engage or disengage the clutch plate and the clutch disc by pressing or releasing the clutch plate, wherein the hydraulic pressure chamber configured to move the piston in a direction close to the clutch plate based on the working hydraulic pressure.

4. The touch point learning apparatus according to claim 3, further comprising:
a return spring configured to transfer the piston in a direction away from the clutch plate by elastically pressing the piston.

5. The touch point learning apparatus according to claim 4, wherein the controller is configured to:
analyze the change; and
identify a stop section and an engagement section, wherein, in the stop section, the working hydraulic pressure is lower than or equal to a preload applied to the piston by the return spring, and wherein, in the engagement section, the working hydraulic pressure corresponds to an engagement pressure higher than the preload and the rate of increase in the working hydraulic pressure per the certain period of time is higher than or equal to the predetermined rate of increase.

6. The touch point learning apparatus according to claim 5, wherein:
when the change reaches the engagement section, the controller is configured to determine that the clutch plate and the clutch disc are engaged.

7. The touch point learning apparatus according to claim 5, wherein the controller is configured to:
analyze the change; and
identify a transfer section, wherein in the transfer section, the working hydraulic pressure corresponds to a transfer pressure between the preload and the engagement pressure and the rate of increase in the working hydraulic pressure per the certain period of time is lower than the predetermined rate of increase.

8. The touch point learning apparatus according to claim 7, wherein:
when the change reaches the transfer section, the controller is configured to determine that transfer of the piston toward the clutch plate is started.

9. The touch point learning apparatus according to claim 1, further comprising:
a hydraulic pressure sensor configured to measure the working hydraulic pressure.

10. A touch point learning method for a clutch where a piston transferred by a working hydraulic pressure is utilized to engage a clutch plate with a clutch disc by pressing the clutch plate, the touch point learning method comprising the steps of:
(a) applying the working hydraulic pressure in a predetermined method;
(b) measuring a change in the working hydraulic pressure; and
(c) determining whether or not the clutch plate and the clutch disc are engaged based on the change,
wherein the step (c) comprises:
when a rate of increase in the working hydraulic pressure per a certain period of time is higher than a predetermined rate of increase, determining that the clutch plate and the clutch disc are engaged.

11. The touch point learning method according to claim 10, wherein the step (c) comprises:
analyzing the change; and
identifying a stop section and an engagement section, wherein, in the stop section, the working hydraulic pressure is lower than or equal to a preload applied to the piston by a return spring, and wherein, in the engagement section, the working hydraulic pressure corresponds to an engagement pressure higher than the preload and the rate of increase in the working hydraulic pressure per the certain period of time is higher than or equal to the predetermined rate of increase.

12. The touch point learning method according to claim 11, wherein the step (c) comprises:
when the change reaches the engagement section, determining that the clutch plate and the clutch disc are engaged.

13. The touch point learning method according to claim 11, wherein the step (c) comprises:
identifying a transfer section, wherein in the transfer section, the working hydraulic pressure corresponds to a transfer pressure between the preload and the engagement pressure and the rate of increase in the working hydraulic pressure per the certain period of time is lower than the predetermined rate of increase.

14. The touch point learning method according to claim 13, wherein the step (c) comprises:
when the change reaches the transfer section, determining that transfer of the piston toward the clutch plate is started.

15. The touch point learning method according to claim 12, further comprising the steps of:
(d) comparing an actual time with a predetermined time, wherein the actual time is measured from a point that the working hydraulic pressure is applied to a point that the change reaches the engagement section; and
(e) when the actual time differs from the predetermined time, switching the predetermined time to the actual time and changing application of the working hydraulic pressure based on the actual time.

16. The touch point learning method according to claim 15, wherein the step (a) is performed based on the application of the working hydraulic pressure changed in the step (e).

* * * * *